United States Patent
Guu et al.

(10) Patent No.: US 10,177,445 B1
(45) Date of Patent: Jan. 8, 2019

(54) COMMUNICATION STRUCTURE

(71) Applicant: NATIONAL CHUNG SHAN INSTITUTE OF SCIENCE AND TECHNOLOGY, Taoyuan (TW)

(72) Inventors: Jiin-An Guu, Taoyuan (TW); Ching-Chyuan Lin, Taoyuan (TW); Chien-Te Yu, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 15/641,382

(22) Filed: Jul. 5, 2017

(51) Int. Cl.
H01Q 1/24 (2006.01)
H04B 1/3827 (2015.01)

(52) U.S. Cl.
CPC .......... *H01Q 1/243* (2013.01); *H04B 1/3827* (2013.01)

(58) Field of Classification Search
None
See application file for complete search history.

(56) References Cited

U.S. PATENT DOCUMENTS

| | | | | |
|---|---|---|---|---|
| 6,498,925 B1* | 12/2002 | Tauchi | ................. | H03F 1/0277 455/115.1 |
| 6,556,811 B1* | 4/2003 | Sayers | ................... | H04B 1/036 343/702 |
| 7,403,748 B1* | 7/2008 | Keskitalo | ................ | H04B 7/06 455/101 |
| 2002/0077138 A1* | 6/2002 | Bark | ................... | H04W 52/242 455/522 |
| 2004/0214606 A1 | 10/2004 | Wichman et al. | | |
| 2017/0257774 A1* | 9/2017 | Ghosh | ................... | H04W 16/14 |

OTHER PUBLICATIONS

Avastar 88W8782, Marvell, 2010 https://www.marvell.com/wireless/assets/marvell_avastar_88W8782.pdf.*
UMTS frequency bands, Wikipedia, 2016 https://web.archive.org/web/20161228062757/https://en.wikipedia.org/wiki/UMTS_frequency_bands.*

* cited by examiner

*Primary Examiner* — Jianxun Yang
(74) *Attorney, Agent, or Firm* — Schmeiser, Olsen & Watts, LLP

(57) ABSTRACT

Communication structure for communication with a mobile communication apparatus includes a signal conduction module having an array of antenna units; and a signal transceiving module including a signal transceiving unit, control unit, and power control unit. The control unit generates a driving signal to the power control unit, which generates a voltage to the signal transceiving unit; the signal transceiving unit generates a corresponding spectrum signal, transferred by the signal conduction module. The mobile communication apparatus receives the spectrum signal and transfers a first feedback signal. The first feedback signal, after being received by the signal conduction module, is transferred to the signal transceiving unit, which generates a second feedback signal to the control unit, the control unit identifies the second feedback signal and generates a control signal to the signal conduction module; the array of antenna units is controlled by the control signal correspondingly to enhance communication quality.

7 Claims, 1 Drawing Sheet

COMMUNICATION STRUCTURE

FIELD OF THE INVENTION

The invention relates to a communication structure, and in particular to a communication structure for communication with a mobile communication apparatus.

BACKGROUND OF THE INVENTION

With the development of communication technology, the demand for data services continues to increase. This stimulates the communications industry to increase the research for wireless systems, so the wireless system operators proceed to do further researches for bandwidth enhancement and higher carrier frequency. For example, the fifth generation of mobile communication system (5G) will have its wireless access utilizing frequencies including millimeter-waves (abbreviated as mm-waves) so as to provide multi-gigabit-per-second data rates in the deployment of microcells, femtocells, or macrocells. Although free space propagation or path loss increases as frequencies become higher, the path loss can be compensated by using antenna directivity. The path loss compensation can be implemented by using a solution of high-gain adaptive beamforming. An adaptive beam steering can be implemented by using analog phase shifters, or combination of digital and analog solutions such as making fully-digital transmission/receiving paths, each of which is provided for an antenna, being connected to a set of antennas. The base station antenna array can include 8, 16, 32, 64, or more antenna elements (e.g., micro horn antennas).

The millimeter-waves having frequencies, for example, 11 to 300 GHz, which are higher than the frequencies used by conventional wireless systems are utilized. The so-called millimeter-waves are electromagnetic waves having frequencies lying among those of the microwaves and the light waves, usually in the millimeter-wave band from 30 to 300 GHz, corresponding to wavelengths between 1 to 10 mm. The millimeter waves can provide a wider frequency band. With the rapid growth of data transfer rates, it is expected that data transfer rates will increase 1000 times by 2020, and 10,000 times by 2025, after the beyond 4G era (Beyond 4G or B4G). Among others, the transmission technology based on millimeter wave (mm-wave) spectrum has been regarded as one of the key communication technologies capable of providing high data transfer rates, and will be playing a pivotal role in the beyond 4G era and even the fifth generation (5G) communication technology development.

A U.S. patent application publication, US2004/0214606 A1, relates to a method and a communication system wherein stations communicate on a wireless interface. The method includes the steps of including beam identity information into signals transmitted on multiple beams provided by a first station; receiving at a second station signals transmitted from the first station; and identifying beams via which the second station received signals from the first station based on the identity information. At least one beam for transmission on the wireless interface between the stations is then selected. A station configured for the communication comprises antenna means for receiving signals transmitted from the other station on multiple beams and a controller for identifying beams based on beam identity information associated with signals received from the other station.

SUMMARY OF THE INVENTION

It is an objective of the present invention to provide a communication structure so as to enhance communication quality between a mobile communication apparatus and the communication structure by controlling an array of antenna units of the communication structure correspondingly using a control signal which is generated by using a feedback signal of the mobile communication apparatus.

To achieve the foregoing objective, a communication structure is provided according to the invention. The communication structure comprises: a signal conduction module and a signal transceiving module. The signal conduction module has an array of antenna units. The signal transceiving module includes a signal transceiving unit, a control unit, and a power control unit. The control unit generates a driving signal to the power control unit; the power control unit generates a voltage to the signal transceiving unit; the signal transceiving unit generates a corresponding spectrum signal, which is transferred by the signal conduction module. When the spectrum signal is transferred to the mobile communication apparatus, the mobile communication apparatus receives the spectrum signal and transfers a first feedback signal. After the first feedback signal is received by the signal conduction module, the first feedback signal is transferred to the signal transceiving unit, the signal transceiving unit generates a second feedback signal to the control unit, the control unit identifies the second feedback signal and then generates a control signal to the signal conduction module, wherein the array of antenna units is controlled by way of the control signal correspondingly, so as to enhance communication quality.

DETAILED DESCRIPTION OF THE PREFERRED EMBODIMENTS

To make it easier for one skilled in the art to understand the object, characteristics and effects of this invention, various embodiments together with the attached drawings for the detailed description of the invention are provided.

Figure 1:
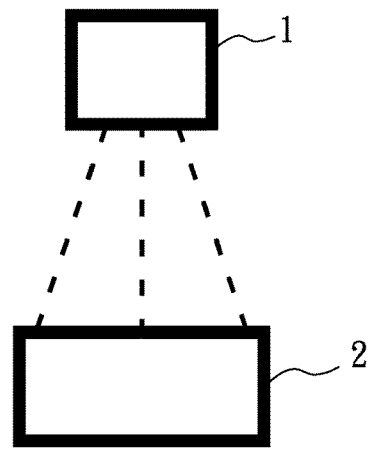
FIG. 1 is a schematic diagram illustrating a communication system according to an embodiment of the invention.

Referring to FIG. 1, a communication system is illustrated in a schematic diagram according to an embodiment of the invention.

Figure 2:
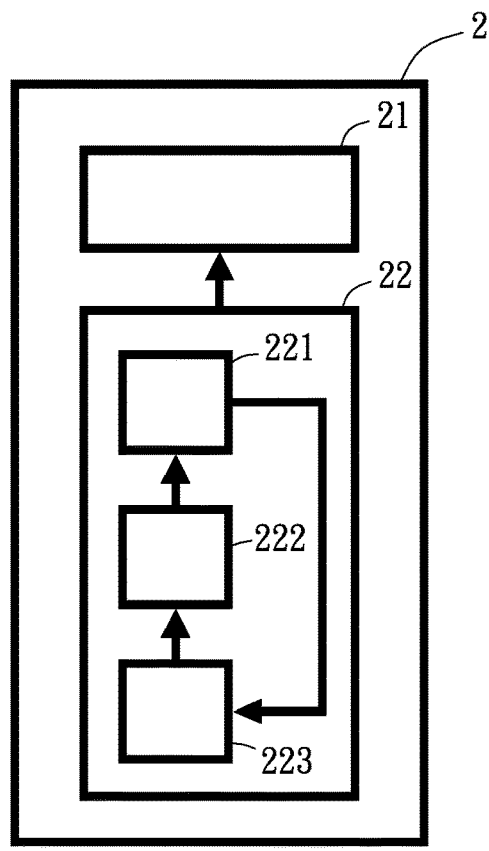
FIG. 2 is a schematic diagram illustrating a communication structure according to an embodiment of the invention.

As illustrated in FIG. 1 and FIG. 2, a communication structure 2 is a transceiving structure for communication with a mobile communication apparatus 1, wherein the mobile communication apparatus 1 is one of a mobile phone, positioning system, and tablet computer, for example. The communication structure 2 comprises: a signal conduction module 21 and a signal transceiving module 22. The signal conduction module 21 has an array of antenna units. For example, the array of antenna units is one of an array antenna, a phased antenna, and a dish antenna. The signal transceiving module 22 includes a signal transceiving unit 221, a control unit 222, and a power control unit 223.

In the present embodiment, the signal transceiving module 22 generates a control signal based on a first feedback signal of the mobile communication apparatus 1 so as to control the array of antenna units of the signal conduction module 21 correspondingly, thereby enhancing communication quality between the mobile communication apparatus 1 and the communication structure 2. The signal transceiving module 22 utilizes the control unit 222 to generate a driving signal to the power control unit 223. The power control unit 223 receives the driving signal and generates a voltage to the signal transceiving unit 221. The signal transceiving unit 221 generates a corresponding spectrum signal, which is transferred by the signal conduction module 21, wherein the spectrum signal is one of a high frequency signal, an intermediate frequency signal, and a low frequency signal. When the spectrum signal is transferred to the mobile communication apparatus 1, the mobile communication apparatus 1 receives the spectrum signal and transfers a first feedback signal. After the first feedback signal is received by the signal conduction module 21, the signal conduction module 21 transfers the first feedback signal to the signal transceiving unit 221. The signal transceiving unit 221 generates a second feedback signal to the control unit 222, the control unit 222 identifies the second feedback signal and then generates a control signal to the signal conduction module 21. Hence, the signal transceiving module 22 utilizes the control signal to control the array of antenna units of the signal conduction module 21 correspondingly, thereby enhancing communication quality between the mobile communication apparatus 1 and the communication structure 2.

For example, the signal conduction module 21 of the communication structure 2 can employ a phased antenna array for signal transmission and receiving, so as to reduce the physical size of the signal transceiving side and accommodate more signal transmission sides and receiving sides.

For example, the signal transceiving module 22 can be implemented by a control chip, which can be a microprocessor, microcontroller, digital signal processor, or a single chip or dedicated control circuit. In addition, the signal transceiving module 22 can further include a heat dissipation structure.

For example, the power control unit 223 is utilized to generate a plurality of power signals for providing electricity internally used by the signal conduction module 22 (such as the signal transceiving module 22) or the communication structure 2. As an example, the power signals include a first power signal and a second power signal, wherein the first power signal has an output voltage of +7V with an output current of 9 A and the second power signal has an output voltage of −7V with an output current of −300 mA. However, the implementation of the invention is not limited to the examples of numerical values; the power control unit 223 can be realized to generate power signals in order to meet the requirement for circuit implementation of the communication structure 2. In addition, for instance, the power control unit 223 can be implemented as being outputting a power signal in response to a driving signal to be inputted, so as to meet the requirement for power management.

Embodiments are provided in the following to illustrate various applications of the communication structure 2.

In an embodiment, the communication structure 2 is configured to be a base station, which is used for communication with the mobile communication apparatus. The embodiment can be applied to any communication system, if appropriate. In order to enhance communication quality between the mobile communication apparatus 1 and the communication structure 2, the communication structure 2 detects whether at least one mobile communication apparatus exists within signal coverage region of the communication structure 2 by using the signal conduction module 21 and the signal transceiving module 22. If at least one mobile communication apparatus is detected by the communication structure 2, the communication structure 2 controls its antenna units so that the antenna units have a field pattern that can enhance the communication quality between the base station and the at least one mobile communication apparatus.

The above embodiment in which the communication structure 2 is configured to be a base station can be further applied to a system for the fourth generation of mobile communication technology (i.e., 4G) or a system for mobile communication technology succeeding 4G, such as a system for the fifth generation of mobile communication technology (i.e., 5G). Accordingly, the communication structure 2 can distribute communication resource (e.g., bandwidth, power) more effectively to the at least one mobile communication apparatus, so as to perform transmission and receiving of a variety of communication services, such as transmission and receiving of data of voice, images, videos, or so on.

In an embodiment based on a 4G or 5G system, a communication structure 2 configured to be a base station can detect whether at least one mobile communication apparatus exists within the signal coverage region of the communication structure 2 by using the signal conduction module 21 and the signal transceiving module 22. For example, a detection is made as to whether there is a mobile communication apparatus compliant with technology of 4G or 5G, and control of the antenna units can be made accordingly.

In order to perform the detection, the signal transceiving module 22 utilizes the control unit 222 to generate a driving signal to the power control unit 223. The power control unit 223 receives the driving signal and generates a voltage to the signal transceiving unit 221 so as to drive the signal transceiving unit 221, such as to make the signal transceiving unit 221 start working or to resume from a lower power operation mode to a normal working mode. The signal transceiving unit 221 generates a corresponding spectrum signal. The spectrum signal is transferred by the signal conduction module 21, wherein the spectrum signal is one of a high frequency signal, an intermediate frequency signal, and a low frequency signal. For instance, the spectrum signal is a signal for detection or positioning of a mobile communication apparatus, and can be implemented in any form such as having identification information, a request for testing, a request for positioning, or test information by the base station. In this way, after receiving the spectrum signal, the mobile communication apparatus 1 can identify the spectrum signal as a signal utilized by the base station for detection or positioning and thus can generate a first feedback signal to be desired by the base station. However, the invention can be implemented without being limited to the example of the spectrum signal.

When the spectrum signal is transferred to the mobile communication apparatus 1, the mobile communication apparatus 1 receives the spectrum signal and transfers a first feedback signal. For example, the feedback signal can be implemented in any form such as having identification information, a result of testing, a result of positioning, or other information by the mobile communication apparatus 1. For example, the first feedback signal can be configured to have information which indicates a signal strength of the base station with respect to the mobile communication apparatus 1 and the signal strength is recorded by the mobile communication apparatus 1 after receiving the spectrum signal. In this way, the base station can identify the first feedback signal, when received, as a signal fed back by a mobile communication apparatus, and thus can further process the first feedback signal. However, the invention can be implemented without being limited to the example of the feedback signal.

After the first feedback signal is received by the signal conduction module 21, the signal conduction module 21 transfers the first feedback signal to the signal transceiving unit 221. The signal transceiving unit 221 generates a second feedback signal based on the first feedback signal to the control unit 222. After the control unit 222 identifies the second feedback signal, it is determined that at least one mobile communication apparatus compliant with technology of 4G or 5G exists within the signal coverage region of the base station. Hence, the control unit 222 generates a control signal to the signal conduction module 21. For example, since the first feedback signal can be implemented as having identification information, a result of testing, a result of positioning, or other information by the mobile communication apparatus 1, the control unit 222 can generate the control signal based on the first feedback signal with beamforming technique, so as to control at least one of parameters such as amplitude, phase, and so on for the antenna units. In this way, the antenna units have a field pattern that enhances the communication quality between the base station and the at least one mobile communication apparatus 1.

Thereby, in the embodiment of a mobile communication system based on 4G or 5G technology, the signal transceiving module 22 controls the corresponding antenna units of the signal conduction module 21 by using the control signal, so as to enhance the communication quality between the at least one mobile communication apparatus 1 and the communication structure 2 that is configured to be the base station.

The above embodiments can be further implemented as, among others, starting to perform the detection when it is required for the mobile communication system, or it is triggered in some condition (such as: starting up or resetting of the base station, or requesting by another base station), or other situation (such as for calibration or correction, or for improvement of communication quality). However, the invention can be implemented without being limited to the examples and may be applied to other situations.

While the invention has been described by means of specific embodiments, numerous modifications and variations could be made thereto by those skilled in the art without departing from the scope and spirit of the invention set forth in the claims.

What is claimed is:

1. A communication structure for a fifth generation of mobile communication technology, which is a transceiving system for communication with a mobile communication apparatus, the communication structure comprising:
    a signal conduction module, having an array of phased antenna;
    a signal transceiving module, including a signal transceiving unit, a control unit, and a power control unit, the control unit generates a driving signal to the power control unit, the power control unit receives the driving signal and generates a voltage to the signal transceiving unit, the signal transceiving unit generates a corresponding spectrum signal, which is transferred by the signal conduction module; when the spectrum signal is transferred to the mobile communication apparatus, the mobile communication apparatus receives the spectrum signal and transfers a first feedback signal; after the first feedback signal is received by the signal conduction module and is transferred to the signal transceiving unit, the signal transceiving unit generates a second feedback signal to the control unit, the control unit identifies the second feedback signal and then generates a control signal to the signal conduction module, wherein the array of phased antenna is controlled by way of the control signal correspondingly, so as to enhance communication quality;
    wherein the power control unit is used for generating a plurality of power signals to provide electricity for the communication structure, the power signals include a first power signal and a second power signal, the first power signal has an output voltage of +7V with an output current of 9A, the second power signal has an output voltage of −7V with an output current of −300 mA.

2. The communication structure according to claim 1, wherein the spectrum signal is a high frequency signal.

3. The communication structure according to claim 1, wherein the spectrum signal is an intermediate frequency signal.

4. The communication structure according to claim 1, wherein the spectrum signal is a low frequency signal.

5. The communication structure according to claim 1, wherein the signal transceiving module is a control chip.

6. The communication structure according to claim 1, wherein the mobile communication apparatus is one of a mobile phone, a positioning system, and a tablet computer.

7. The communication structure according to claim 1, wherein the signal transceiving module further comprises: a heat dissipation structure.

* * * * *